(No Model.) 2 Sheets—Sheet 1.
D. W. GLENDINNING.
AUTOMATIC DAMPER FOR FURNACES, &c.
No. 487,521. Patented Dec. 6, 1892.
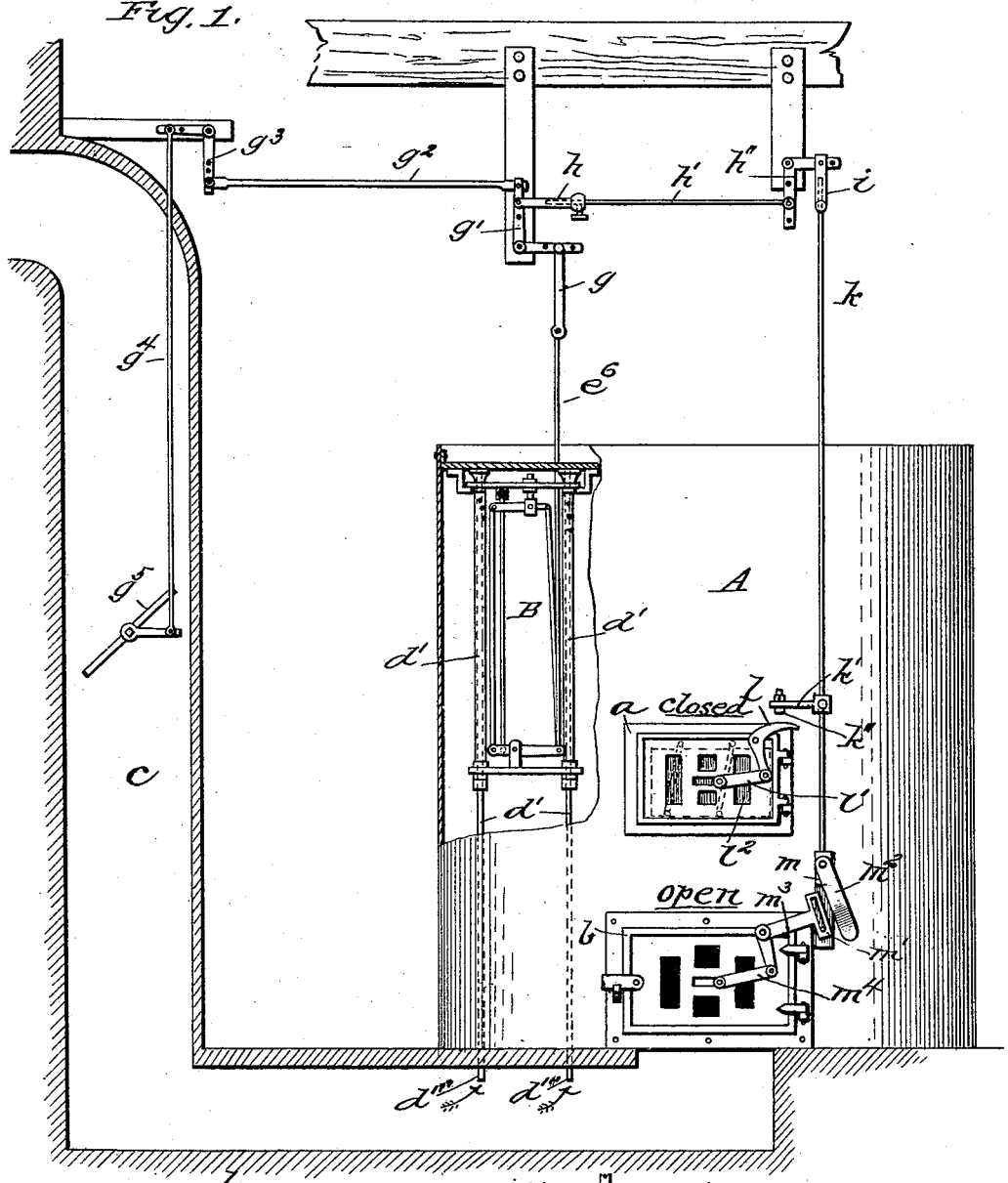
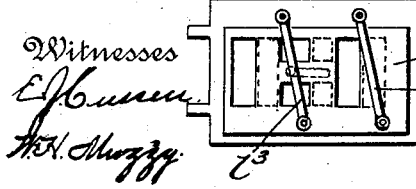

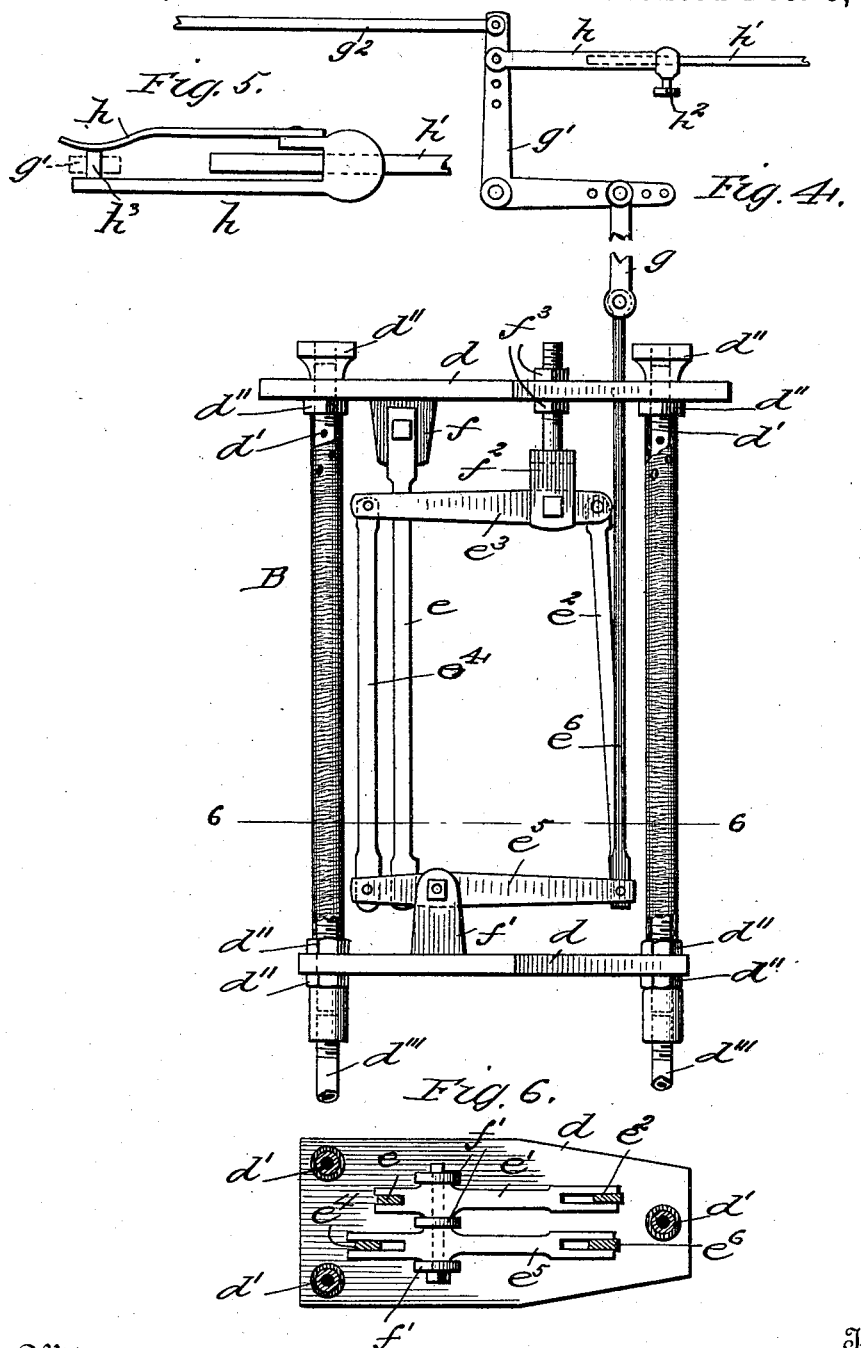

UNITED STATES PATENT OFFICE.

DAVID W. GLENDINNING, OF DENVER, COLORADO.

AUTOMATIC DAMPER FOR FURNACES, &c.

SPECIFICATION forming part of Letters Patent No. 487,521, dated December 6, 1892.

Application filed June 25, 1892. Serial No. 438,012. (No model.)

*To all whom it may concern:*

Be it known that I, DAVID W. GLENDINNING, a citizen of the United States, residing at Denver, in the county of Arapahoe and State of Colorado, have invented certain new and useful Improvements in Automatic Dampers for Furnaces, &c., of which the following is a specification, reference being had therein to the accompanying drawings, in which—

Figure 1 represents a front elevation, partly in section, of an ordinary air-heating furnace used in supplying buildings with fresh heated air, the furnace being provided with the preferred form of my invention; Fig. 2, an inside view of the upper or charging door of the furnace, showing more clearly the automatically-closing damper; Fig. 3, a detail vertical section of the swiveled device connecting the lower end of the operating-rod to the damper of the lower door; Fig. 4, a detail side view of the expansion device for operating the dampers; Fig. 5, a detail view of one of the adjustable connecting devices, and Fig. 6 a horizontal section on the line 6 6 of Fig. 4.

This invention relates to that class of furnace and stove attachments wherein the supply-dampers are automatically operated and adjusted by the heat of the furnace or stove, the degree of heat determining the quantity of air supplied to the fire; and it has for its object the provision of simple and efficient means for automatically regulating the quantity of fresh air supplied to the heating chambers or drums of the furnace when the attachment is used on an air-heating furnace, and also for automatically adjusting the supply-dampers of the upper and lower doors of the furnace, as will more fully hereinafter appear, and be particularly pointed out in the claims appended.

Referring to the drawings, A designates the furnace, $a$ the upper or charging door, and $b$ the lower or ash door; $c$, the flume or duct for supplying fresh air to the heating-space of the furnace, and B the operating expansion device, which is suitably suspended within the shell of the furnace. In the construction of this expansion device I use two metal plates $d\ d$, connected together by three or more vertical iron pipes $d'$, the ends of the pipes passing through the plates and clamped thereto by nuts $d''$, tapped on the pipes and bearing against opposite sides of the plates. These pipes are provided with openings at or near their upper ends, and they are preferably covered by asbestus to keep their temperature as low as possible and prevent expansion, and coupled to their lower ends are pipe extensions $d'''$, which are carried down to the fresh-air conduit or to some other air-supply. The object in providing the pipes with openings at the upper ends and extending their lower ends to the outside of the furnace is to insure a circulation of fresh cold air through them, which serves to keep down their temperature and prevent expansion as much as possible. Pivotally depending from a lug $f$ on the under side of the upper plate $d$ is an expansion-rod $e$, which is pivotally connected at its lower end to the shorter arm of a multiplying-lever $e'$, fulcrumed between lugs $f'$ on the lower plate $d$, and the longer arm of this lever is in turn pivotally connected to another vertical expansion-rod $e^2$, which has its upper end pivotally connected to the shorter arm of another lever $e^3$, fulcrumed in the slotted head of a bolt $f^2$, adjustably connected to the upper plate by clamping-nuts $f^3$, this adjustability being for the purpose of permitting the lever to be raised or lowered, as the exigencies of the case may require. The longer arm of lever $e^3$ is pivotally connected to another expansion-rod $e^4$, which in turn is pivotally connected to the shorter arm of a similar lever fulcrumed alongside the lever $e'$ on the lower plate, and to the longer arm of this lever $e^4$ is pivotally connected a rod $e^6$, which extends up through the top of the furnace and is connected to the damper-operating devices. The cluster of expansion-rods are constructed of some metal which expands readily and to a large degree, such as brass, and the connecting-pipes are so constructed and protected as to expand but a small degree, whereby the maximum movement from the expansion of the rods is obtained.

The operation of the expansion-rod is evident. The movement obtained by the expansion of rod $e$ is increased several times by the lever $e'$, and the movement of the longer arm of this lever, in addition to the expansion of rod $e^2$, is again multiplied by the upper lever, and the motion of this upper lever, in addition to the movement derived from the expansion of the rod $e^4$, is further multiplied by the lever $e^5$ and transmitted to the operating-rod $e^6$. The relative length of the levers and rods will be proportioned to the length of movement desired, as is evident. In this manner ample motion may be derived to operate the dampers of the furnace.

The upper end of rod $e^6$ is adjustably connected by a rod $g$ to the horizontal arm of a bell-crank lever $g'$, pivoted on a suitable stationary part above the furnace, and adjustably connected to the vertical arm of this lever $g'$ is a rod $g^2$, whose other end is connected to the vertical arm of another bell-crank $g^3$, the horizontal arm of this latter bell-crank being adjustably connected by a rod $g^4$ to the operating-arm of the damper $g^5$, pivoted at a suitable point in the fresh-air duct $c$. By means of these connecting rods and levers it will be observed that as the temperature of the furnace rises the augmented motion of the expansion-rods in the furnace is transmitted to the damper and opens the same to permit the fresh air to pass into the heating-space of the furnace, the volume of air passing into the furnace being governed altogether by the temperature of the same, the higher being the degree of heat, the larger being the quantity of air supplied, thereby insuring the supply of only that quantity of air which the furnace is able to properly heat.

Another rod $h'$ is adjustably connected at one end to the vertical arm of the bell-crank $g'$ by a plate or bar $h$, the end of said rod $h'$ being adjustably held in a head on the end of the plate or bar $h$ by a set-screw $h^2$. The part $h$ is connected to the bell-crank by a lateral pivot $h^3$, entering one of a series of holes in the same, this pivot being removably held in the desired hole by a leaf-spring $h^4$, secured on the part $h$ and normally bearing on the end of the pivot, as shown most clearly in Fig. 5. The other end of rod $h'$ is adjustably connected to the vertical arm of another bell-crank $h''$, which has its horizontal arm adjustably connected by means of a plate $i$, similar to the plate $h$, to a long vertical operating-rod K, which extends down in front of the furnace near the hinges of its two doors $a$ $b$. At a point above the upper door an arm $k'$ is adjustably secured to rod $k$, and on the end of this arm is adjustably secured a bearing-block $k''$, which is adapted when rod $k$ is depressed to bear upon and depress the curved upper arm of an angle-lever $l$, pivoted on the hinged charging-door. The lower arm of this angle-lever is pivotally connected to the damper-plate 12 on the inside of the door by a link $l''$, this damper-plate being provided with the usual openings corresponding with those in the door. This damper is loosely suspended on the inside of the door by two or more pivotal depending links 13, connected at their upper ends to the door and at their lower ends near the lower edge of the damper, as shown in Fig. 2, the links being slightly inclined downwardly and away from the hinges of the door. As thus constructed the damper remains normally closed until the curved arm of the angle-lever is depressed, whereupon the damper is forced toward the outer edge of the door far enough to bring its openings opposite those in the door and permit the entrance of air over the fire. When the curved arm is released, the damper automatically swings or gravitates back to a closed position, as shown in Figs. 1 and 2.

The object in making the bearing-block $k''$ adjustable on the arm $k'$ is to vary its point of contact with the curved arm of the angle-lever and thereby vary the length of movement of the damper, as is evident, and the object in adjustably connecting the rods $g^4$, $g^2$, $h'$, and $k$ and the bell-cranks is to enable the parts to be nicely adjusted and set so as to impart the proper length of movement at the proper times to the various dampers, as is obvious.

Swiveled to the lower end of the rod $k$ is a plate $m$, provided with a pivot $m'$ at its lower end, which works in a vertical slot in the end of the lateral arm of a bell-crank $m^3$, the pivot being prevented from leaving the slot by a leaf-spring $m^2$, pivoted on the plate near its upper end and normally bearing on the outer end of the pivot, as shown most clearly in Figs. 1 and 3. The angle-lever $m^3$ is pivoted on the lower door near its upper edge, and has its downwardly-extending arm pivotally connected to the sliding damper-plate on the lower door by a link $m^4$. When the furnace is cold, the rod $k$ is at its highest point, in which position the upper damper is of course closed and the lower one open, and the pin $m'$ rests in the upper end of the slot in the arm of the bell-crank. As the rod is depressed by the heat, the pin $m'$ moves down in the slot, but no movement is transmitted to the damper until it reaches the lower end of its slot, whereupon it begins to depress the horizontal arm of the bell-crank and close the damper of the lower door. This limited motion of the rod $k$ independently of the angle-lever $m^3$ is for the purpose of permitting the furnace to be maintained at a predetermined temperature without operating the damper. The rod $k$ has sufficient lateral swing on its pivot or by reason of its elasticity to permit it to move laterally slightly as its pin $m'$ passes up in the inclined slot of the lever $m^3$, as is evident. The arm $k'$ is preferably so adjusted on the rod $k$ that it will impinge upon the bell-crank $l$ and begin to open the upper damper just as the lower one is closed, so that should the entire shutting off of the draft from under the fire be insufficient to reduce the temperature of the furnace the continued movement of the rod will uncover the upper draft-openings and permit the draft to pass in over the top of the fire and thereby further reduce its intensity, as is evident.

It will be observed that this invention is very simple in construction and entirely automatic in operation after the fire is started.

The object in swivelly connecting the angle-lever on the lower door to the operating-rod at a point near the hinges of the door is to permit the latter to be freely opened and shut without disconnecting the parts or disturbing their relative arrangement, as is obvious.

Having thus fully described my invention, what I claim, and desire to secure by Letters Patent, is—

1. The combination, in a device for operating dampers, of a furnace, the combination of a pair of plates, pipes located within the furnace and rigidly connecting these plates, said pipes having openings at their upper ends and their lower ends extended to the outside of the furnace, and expansion devices mounted between the plates and connected to an operating-rod, substantially as described.

2. The combination of a furnace provided with an upper and a lower door and a fresh-air duct leading to its heating-space, an expansion device B, supported in the heating-space and having its operating-rod $e^6$ extending up out of the furnace, a damper in the fresh-air duct, and a series of rods connecting the damper to the operating-rod of the expansion device, an automatic damper on the upper door, and an angle-lever on the door for operating it, a vertical operating-rod $k$, connected with the rod $e^6$, an arm $k'$ on this rod and adapted to strike the angle-lever on the door when it is depressed, a damper in the lower door, and an angle-lever $m^3$ for operating it, and means for swiveling this lever to the rod $k$, substantially as described.

3. The combination of a furnace provided with a door having a draft-opening, a sliding damper carried by the door, an angle-lever $l$, pivoted on the door and pivotally connected to the damper, a vertically-moving operating-rod provided with an arm $k$, and an adjustable bearing-block carried by this arm and adapted to strike the upper arm of the single lever when the operating-rod is depressed, substantially as described.

4. The combination of a furnace provided with a door having draft-openings, an automatically-closing sliding damper carried by the door, an operating angle-lever pivoted on the door and pivotally connected to the damper, a movable arm for operating said angle-lever, and means for automatically moving said arm, substantially as described.

5. The combination of a furnace provided with a door, a gravitating sliding damper carried by the door and adapted to close automatically, an angle-lever pivoted on the door and connected to the damper, a movable rod carrying an adjustable arm adapted to strike the angle-lever when the rod is depressed, and means for depressing the rod, substantially as described.

6. The combination of a furnace provided with a swinging door, said door having a movable damper, means carried by the door for operating the damper, a vertically-movable operating-rod connected to said means on the door by a swivel connection, whereby the door may be swung without operating the damper, and means for automatically operating the rod, substantially as described.

7. The combination of a furnace provided with a door, a damper carried by the door, an angle-lever pivoted on the door and having one of its arms connected to the damper and its other one extending to the hinge side of the door and provided with a vertical slot, a movable rod provided with a pin working in said slot, and means for automatically operating said rod, whereby the rod will be permitted to have a limited vertical movement the length of the slot without moving the damper, substantially as described.

In testimony whereof I affix my signature in presence of two witnesses.

DAVID W. GLENDINNING.

Witnesses:
E. H. RANDALL,
JENNIE E. HITCHCOCK.